United States Patent
Paulraj et al.

(10) Patent No.: US 11,429,541 B2
(45) Date of Patent: Aug. 30, 2022

(54) UNLOCKING OF COMPUTER STORAGE DEVICES

(71) Applicant: DELL PRODUCTS L.P., Round Rock, TX (US)

(72) Inventors: Deepaganesh Paulraj, Bangalore (IN); Manjunath Vishwanath, Bangalore (IN); Rama Rao Bisa, Bangalore (IN); Chitrak Gupta, Bangalore (IN); Elie Antoun Jreij, Pflugerville, TX (US)

(73) Assignee: Dell Products L.P., Round Rock, TX (US)

(*) Notice: Subject to any disclaimer, the term of this patent is extended or adjusted under 35 U.S.C. 154(b) by 722 days.

(21) Appl. No.: 16/241,817

(22) Filed: Jan. 7, 2019

(65) Prior Publication Data

US 2020/0218670 A1    Jul. 9, 2020

(51) Int. Cl.
*G06F 12/14* (2006.01)
*H04L 9/08* (2006.01)
*G06F 9/50* (2006.01)

(52) U.S. Cl.
CPC ........ *G06F 12/1408* (2013.01); *G06F 9/5038* (2013.01); *H04L 9/08* (2013.01)

(58) Field of Classification Search
CPC .... G06F 12/1408; G06F 9/5038; G06F 3/067; G06F 21/575; G06F 3/0622; G06F 3/0623; G06F 21/81; H04L 9/08
See application file for complete search history.

(56) References Cited

U.S. PATENT DOCUMENTS

| | | | | |
|---|---|---|---|---|
| 8,156,247 | B2* | 4/2012 | McMillen | H04L 63/1408 709/224 |
| 8,856,553 | B2* | 10/2014 | Lyakhovitskiy | G06F 21/00 713/193 |
| 8,938,626 | B2 | 1/2015 | Jaber et al. | |
| 9,141,447 | B2* | 9/2015 | Sigalov | G06F 9/546 |
| 9,921,978 | B1* | 3/2018 | Chan | G06F 21/78 |
| 10,069,625 | B2* | 9/2018 | Chen | H04L 9/0822 |
| 10,382,201 | B1* | 8/2019 | Allo | G06F 21/575 |
| 10,460,110 | B1* | 10/2019 | Allo | H04L 9/14 |

(Continued)

FOREIGN PATENT DOCUMENTS

KR    20170101748    * 9/2017    ........... G06F 9/4401

OTHER PUBLICATIONS

Machine translation of Korean patent application KR 20170101748 A, Oh S. Kyo et al. (Year: 2017).*

(Continued)

*Primary Examiner* — Shanto Abedin
(74) *Attorney, Agent, or Firm* — Joseph Mencher

(57) ABSTRACT

On power-up, self-encrypting drives (SEDs, 150) are unlocked one after another in an order based on the SEDs' unlocking priorities. In determining the priorities, one or more of the following factors are taken into account: (1) the content stored on the SEDs; the SEDs storing the OS are given higher priorities; (2) the SEDs' access history on previous power-ups: if a SED was accessed earlier than other SEDs, then this SED is given a higher priority; (3) whether there is an access request pending for a SED. Such prioritization allows the system to reach full functionality faster on power-ups. Other features are also provided.

20 Claims, 5 Drawing Sheets

(56) References Cited

U.S. PATENT DOCUMENTS

| | | | | |
|---|---|---|---|---|
| 2003/0188183 | A1* | 10/2003 | Lee | G06F 21/10 |
| | | | | 726/30 |
| 2007/0192828 | A1* | 8/2007 | Messina | G06F 12/1425 |
| | | | | 711/E12.099 |
| 2009/0119785 | A1* | 5/2009 | Challener | G06F 21/82 |
| | | | | 726/34 |
| 2014/0130188 | A1* | 5/2014 | Baryudin | G06F 21/44 |
| | | | | 726/29 |
| 2014/0310532 | A1* | 10/2014 | Ali | G06F 12/1408 |
| | | | | 713/189 |
| 2014/0344617 | A1* | 11/2014 | Resch | G06F 11/1092 |
| | | | | 714/6.31 |
| 2017/0337140 | A1* | 11/2017 | Ragupathi | H04L 67/1097 |
| 2019/0109711 | A1* | 4/2019 | Gladwin | H04L 9/0869 |
| 2019/0207748 | A1* | 7/2019 | Courtney | H04L 9/30 |
| 2019/0243784 | A1* | 8/2019 | Hann | G06F 13/4045 |
| 2020/0044868 | A1* | 2/2020 | Vakulenko | G06F 21/305 |

OTHER PUBLICATIONS

Machine translation of Japanese patent application JP 2012252536 A. Kensuke et al. (Year: 2012).*

* cited by examiner

UNLOCKING OF COMPUTER STORAGE DEVICES

BACKGROUND OF THE INVENTION

The present invention relates to computer systems, and more particularly to locking of computer components for enhanced data security.

FIG. 1 illustrates an exemplary computer system 102. Computer processor or processors 110 execute computer instructions stored in computer memory 120, and use memory 120 for data storage. Specifically, the memory stores an operating system (OS) 130 and OS drivers 134, and stores some boot-strapping software 140 executed when the system is powered-up or reset. Examples of boot-strapping software 140 include BIOS (Basic Input Output System) and UEFI (Unified Extensible Firmware Interface). Memory 120 may include both volatile and non-volatile memory, and may store other types of computer programs and data. BIOS 140 is typically stored in the non-volatile portion of memory 120.

Storage devices 150 (i.e. 150.1, 150.2, etc.), such as hard disk drives (HDD) solid state drives (SDD), and possibly other types, provide additional storage for programs and data, including a non-volatile storage for OS 130 and OS drivers 134. The OS and its drivers are loaded from devices 150 into memory 120 when the system 102 is powered-up or reset.

Storage 150 can be larger and/or less expensive than memory 120.

For security reasons, some or all of devices 150 may be encrypted; more precisely, the data stored on these devices are encrypted. If a device 150 is a self-encrypting drive (SED), the encryption is performed by the device itself. Any data written to the drive 150 are encrypted by the drive before being written onto the drive's storage medium 150M. When the drive receives a read request, the drive reads the data out of its storage medium 150M, and decrypts the data before providing it to the requesting device, e.g. processor(s) 110 or memory 120.

SEDs are described, for example, in U.S. Pat. No. 10,069,625 B2, issued on Sep. 4, 2018 to Chen, incorporated herein by reference.

Each self-encrypting drive 150 stores a corresponding encryption/decryption key ("Data Encryption Key" or DEK) 164 used for the drive's encryption/decryption operations. Some SEDs allow encrypting the DEK itself, using a separate key called Key Encryption Key or KEK. The encrypted DEK is shown at 168, using a common notation "Enc(KEK, DEK)". The SED 150 stores the DEK only in encrypted form 168 when the drive is powered down. Therefore, when the SED is powered up, the DEK is decrypted to "unlock" the drive. But the corresponding KEK is not stored on the drive for security reasons. When the drive is powered up, the KEK is provided to the drive by another component of computer system 102, and specifically by service processor 170 (iDRAC) described below.

In FIG. 1, the DEK and the KEK are shown for only one drive 150, but they can be used with every SED. Different SEDs 150 may have different DEKs, encrypted by respective different KEKs.

In the example of FIG. 1, the KEKs are stored on service processor 170, as shown at 174. More particularly, the KEKs are stored in the service processor's module 170L, called "Local Key Manager" or LKM. Processor 170 can be Dell Remote Access Manager (DRAC) available from Dell Corporation of Texas, United States of America. DRAC 170 can be part of the computer system's motherboard, in which case it is called "integrated DRAC" or "iDRAC".

iDRAC 170 includes a computer processor or processors (not shown), a memory (not shown), and perhaps other components. iDRAC allows an external computer (not shown) to access the computer system 102 over network 180 for management purposes even when the processors 110 are down or the OS 130 is corrupt both in memory 120 and in drives 150. LKM 170L includes memory storage 174 for the KEKs as noted above. The KEKs 174 (i.e. the KEKs in storage 174) can be generated internally or received over network 180, e.g. from Enterprise Key Management Service (EKMS) 182. iDRAC 170, and other components of computer system 102, are connected to network 180 through a Network Interface Device (NID) 186.

Also shown in FIG. 1 is a bus 160 interconnecting the processors 110, the memory 120, iDRAC 170, and NID 186. The devices 150 are connected to bus 160 through an interface 190, shown as "Host Bus Interface" or HBA. Other types of interfaces can also be used; see e.g. U.S. Pre-Grant Patent Publication No. 2017/0337140 A1 (inventors: Ragupathi et al.), published on Nov. 23, 2017, incorporated herein by reference. In addition to bus 160, iDRAC 170 is connected HBA 190 by a separate bus 194, which is a fairly slow bus of type "I2C".

FIG. 2 is a flowchart illustrating the unlocking of drives 150 on power-up of computer system 102. The power is turned on at step 210. At this point, as shown at step 220, a processor 110 starts executing BIOS 140. At step 224, the BIOS causes the processor or processors 110 to detect the drives 150 and store a list 140A of drives 150 in memory 120. At step 230, the iDRAC's module 170S (shown as iSM or "integrated Service Module") reads the list of drives 150 from BIOS storage 140A. At step 240, iDRAC 170 also gets the KEKs for drives 150 from an external storage, e.g. EKMS 182, or from LKM storage 174.

For each drive 150 in list 140A, if the drive is locked, iDRAC 170 sends an unlock command to HBA 190 via the bus 194. Specifically, at step 250, the iDRAC gets the first locked drive 150 from the BIOS list 140A. At step 260, the iDRAC unlocks the drive, i.e. sends an unlock command to HBA 190 and waits for the HBA to respond.

At step 270, the iDRAC determines if all the locked drives on list 140A have been unlocked. If the answer is positive, the unlocking operation terminates. If the answer is negative, the iDRAC returns to step 250 to unlock the remaining locked drives.

SUMMARY

This section summarizes some features of the invention. Other features may be described in the subsequent sections. The invention is defined by the appended claims, which are incorporated into this section by reference.

The inventors have observed that the unlocking operation—steps 250 and 260 in FIG. 2—can significantly slow down the boot process, especially in the presence of many locked drives 150. A computer system 102 may have hundreds or thousands of self-encrypting drives; an example of such a computer system is a data center server. Unlocking a single drive may take 100 ms, adding up to 10 seconds for every 100 drives to unlock.

Therefore, some embodiments of the present invention allow intelligent unlocking of drives 150, giving priority to those drives 150 that are likely to be accessed earlier by processors 110 or by some other devices. Other drives can be unlocked while the system uses earlier unlocked drives.

For example, in FIG. 1, drive 150.2 contains the OS 130, and this drive should be unlocked early, so that the processors 110 may load the OS into memory 120 while other drives are being unlocked. Drive 150.3 stores the OS drivers 134, so drive 150.3 should also be unlocked early.

In some embodiments, the unlocking sequence also takes into account the history of drive access. For example, suppose that in the previous boot process, drive 150.1 was accessed before drive 150.4. Then in the current boot process, drive 150.1 is unlocked before 150.4. The unlocking sequence may also take into account the frequency of past drive accesses both during and after the boot operations: the more frequently accessed drives can be unlocked earlier.

In some embodiments, at least some of the historical data are weighted, giving more weight to the more recent data.

The invention is not limited to iDRAC, servers, or other features or advantages described above, except as defined by the appended claims.

DESCRIPTION OF SOME EMBODIMENTS

The embodiments described in this section illustrate but do not limit the invention. The invention is defined by the appended claims.

Figure 1:
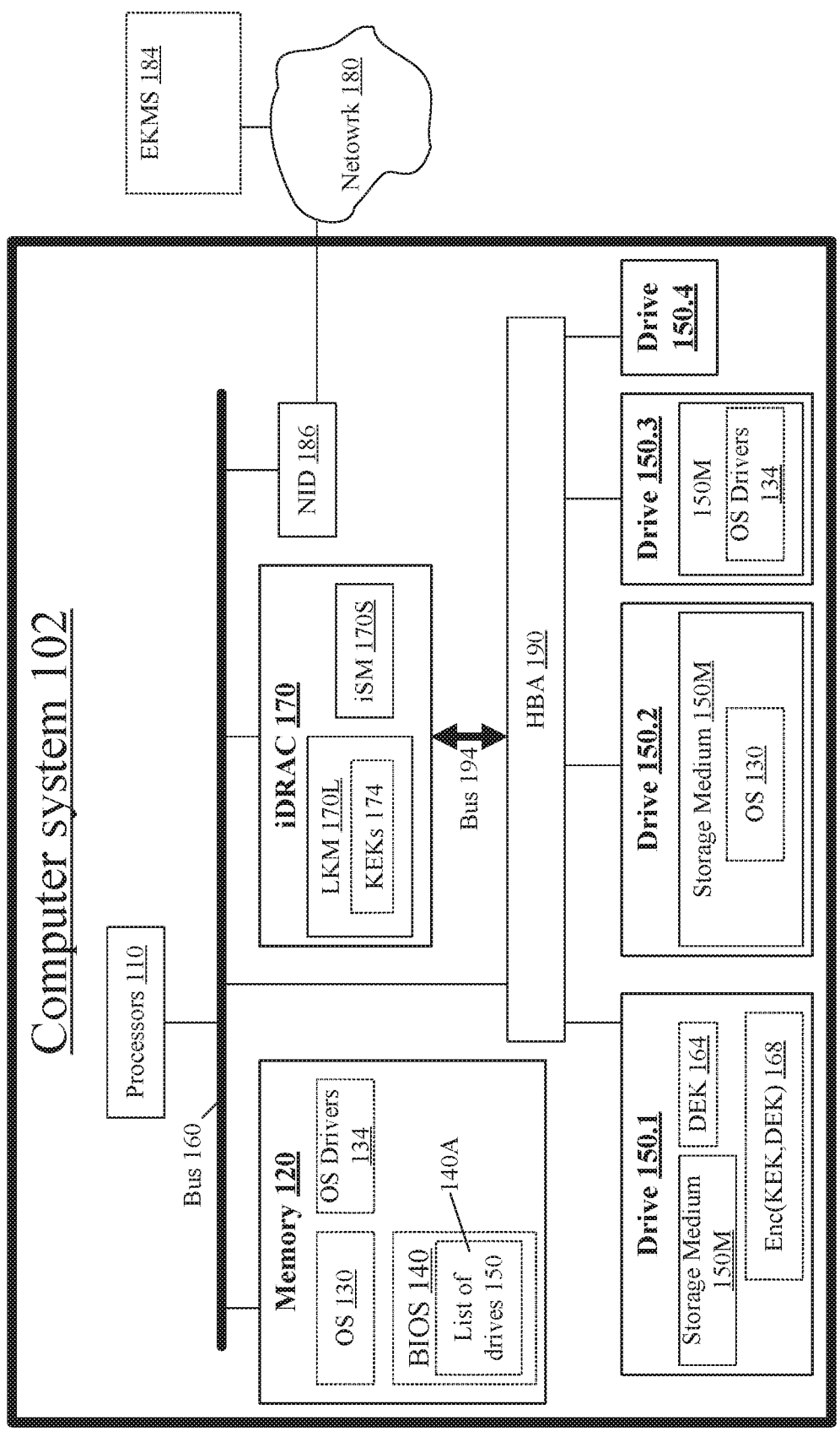
FIG. 1 is a block diagram of a system with storage devices according to prior art.
Figure 3:
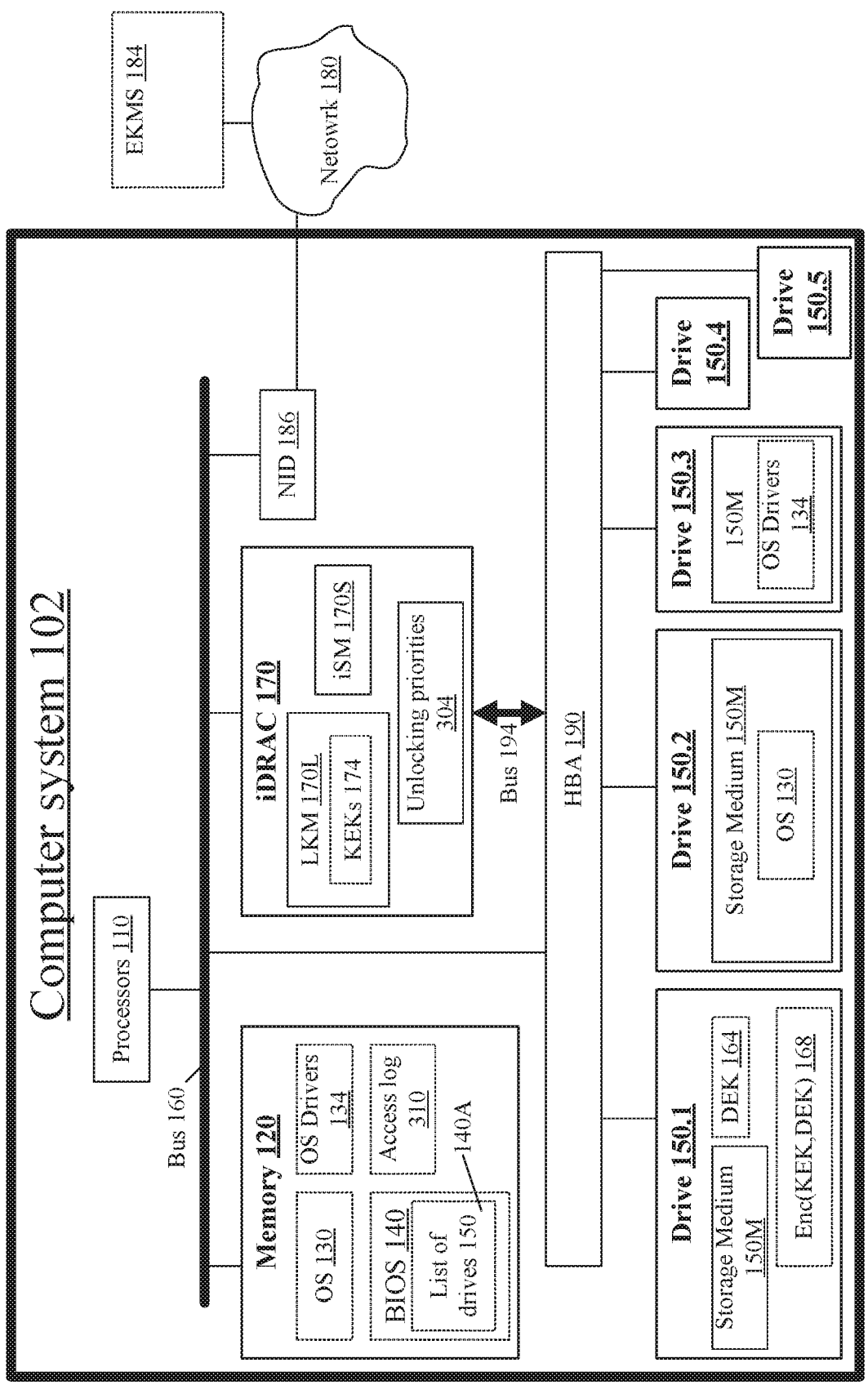
FIG. 3 is a block diagram of a system with storage devices according to some embodiments of the present invention.

FIG. 3 illustrates a computer system 102 implementing some embodiments of the present invention. This system may be identical to the system of FIG. 1 except as described below.

In particular, iDRAC 170 creates and maintains an unlocking priorities database 304, containing the unlocking priorities of self-encrypting drives 150.

Further, a non-volatile portion of memory 120 stores access log 310, which record the access history of drives 150. For each access of a drive 150, access log 310 records the drive ID, the time of access, and possibly other information including, for example, the type of access; read, write, etc. Access log 310 is created and maintained by processors 110 and/or iDRAC 170 and/or some other part of the system.

Priority database 304 may be constructed taking into account the access log 310.

Figure 2:
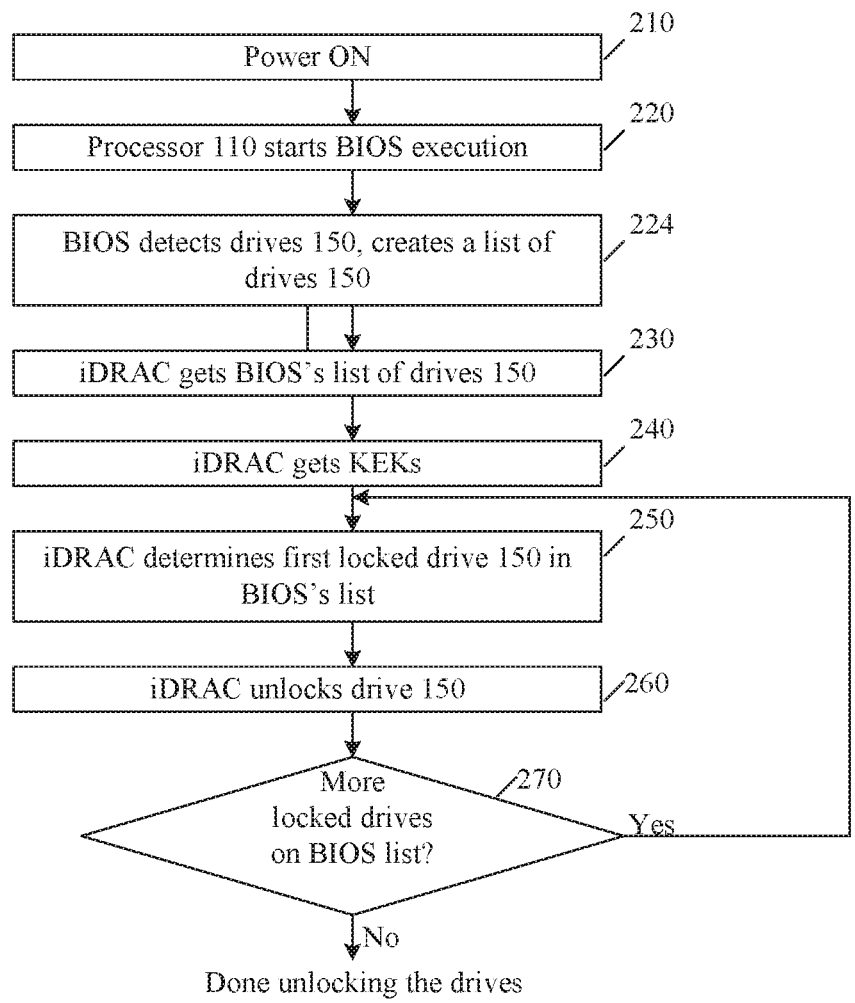
FIG. 2 is a flowchart of a storage device unlocking operation in the system of FIG. 1.
Figure 4:
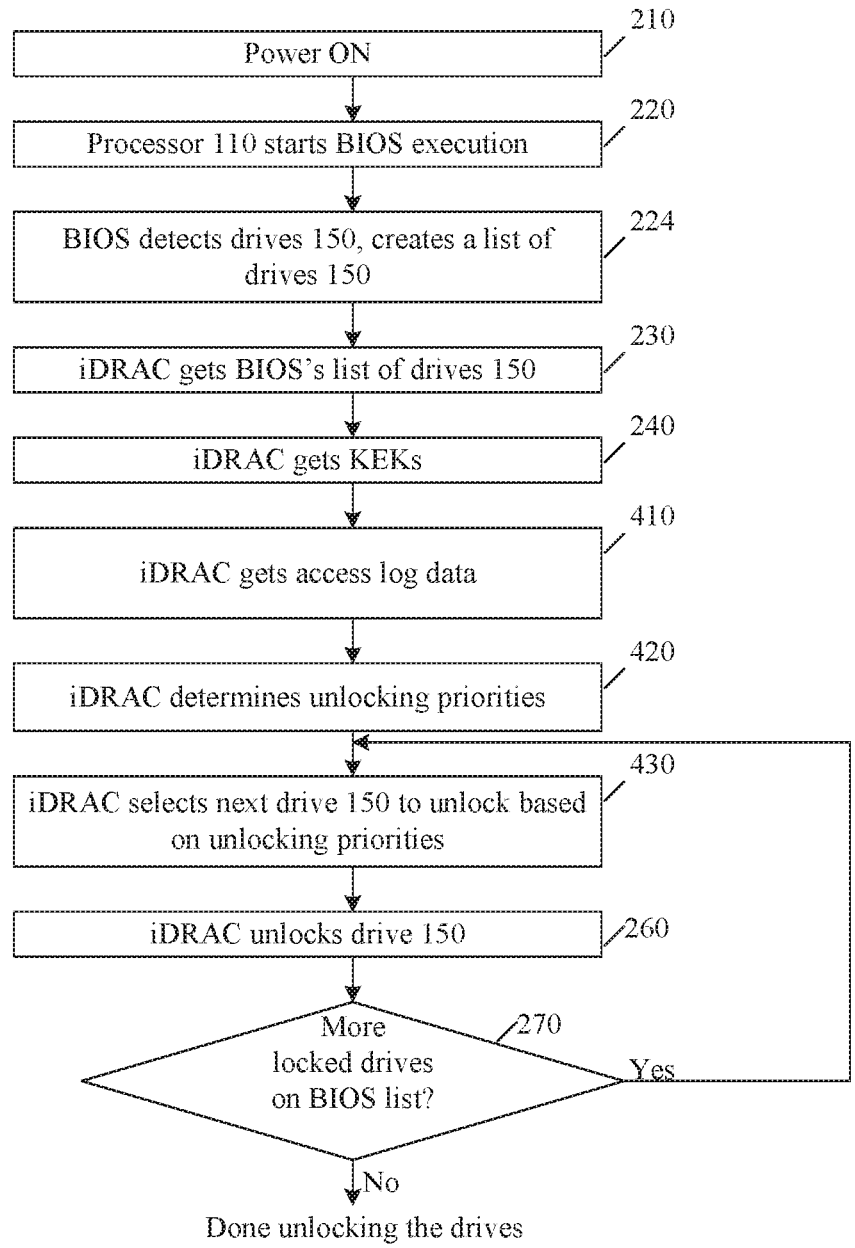
FIG. 4 is a flowchart of a storage device unlocking operation according to some embodiments of the present invention.

FIG. 4 is a flowchart illustrating the unlocking the drives 150 on power-up of computer system 102. Steps 210, 220, 224, 230, 240 are as in FIG. 2.

At step 410, iDRAC 170 (possibly iSM 170S) gets pertinent drive access data from log 310. At step 420, iDRAC 170 builds the database 304.

At step 430, the iDRAC selects the first locked drive 150 to unlock based on priority database 304. Steps 260 is as in FIG. 2: the iDRAC unlocks the drive. At step 270, the iDRAC determines whether all the locked drives have been unlocked. If there are no more drives to unlock, the unlocking operation terminates. If there is at least one more drive to unlock, the iDRAC returns to step 430 to unlock the remaining locked drives.

In some embodiments, the priority database 304 can change between different iterations of step 430. For example, in some embodiments, if there is an access event on a locked drive 150, i.e. if some device attempts to access the locked drive, then the drive's priority is increased in database 304, so that the next iteration of step 430 will take this increased priority into account.

Figure 5:
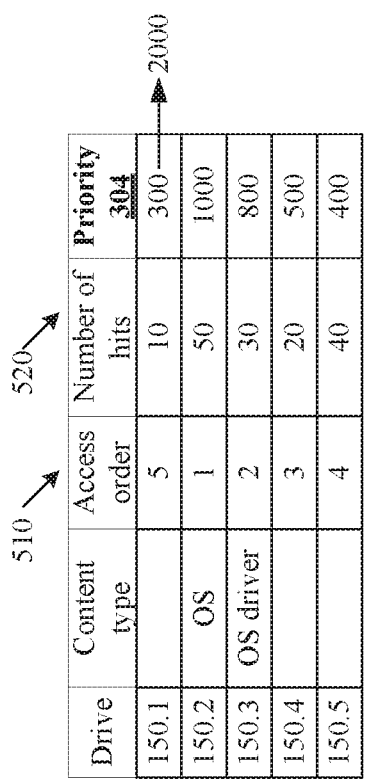
FIG. 5 illustrates unlocking priorities of storage devices according to some embodiments of the present invention.

FIG. 5 shows exemplary priorities in database 304, that have been determined, at step 420, based on the following chain of factors ("chain (1)").

$$\text{Priority:=Event>OS>OS driver>Access order>No. of hits} \quad (1)$$

In this chain, the most important factor is "Event", i.e. that an access event is pending for the drive. The next most important factor, "OS", means that the drive stores at least part of OS 130 (such as drive 150.2 in FIG. 3). "OS driver" means that the drive stores at least part of an OS driver (such as drive 150.3 in FIG. 3).

"Access order" denotes prioritization based on the order in which the drives were accessed in the previous power-up. The access order is determined by iDRAC 170 from access log 310. In the example of FIG. 5, the access order is shown at 510 as 150.2 (access order of 1), then 150.3, then 150.4, then 150.5, then 150.1.

"No. of hits" denotes prioritization based on the total number of accesses ("hits") of a drive 150. This information is obtained from log 310. The hits are counted since the beginning of time, i.e. during the entire time that the log 310 has been kept. In the example of FIG. 5, the number of hits is shown at 520.

The drives are prioritized as follows. The highest priority is given to a drive 150 on which there is an access event pending. In FIG. 5, drive 150.1 was initially given priority 300 at step 420, but this priority was increased to 2000, higher than any other drive, when an access event occurred on the drive. When an access event occurs on any drive, the drive's priority is set to some predetermined value or increased by a predetermined value, to make the priority higher than any other drive with no access event pending. This priority increase may occur at any time, not necessarily at step 420.

The next highest priority is given to the drives based on the "OS" factor: each drive that stores at least part of the OS receives priority 1000 in FIG. 5. (The particular priority numbers are exemplary and not limiting.)

The next highest priority is given based on the "OS driver" factor, to give priority 800 to the drives that store at least a portion of an OS driver.

The next highest priority is given based on the drives' access order 510, to give higher priorities to the drives that have a lower access order. Thus, the drives 150.4, 150.5, 150.1 receive respective priorities of 500, 400, 300 based on the access order. The remaining drives 150.2, 150.3 were prioritized on more important factors ("OS" and "OS driver"), so their priorities do not depend on the access order or other factors.

The next highest priority is given based on the number of hits (520 in FIG. 5). In the example of FIG. 5, this factor is not used because all the drives 150 have been prioritized based on the more important factors. The number of hits is used if some drives have not been prioritized based on the more important factors. For example, if there are multiple drives that have not been accessed since the previous power-up, and these drives do not have an event pending, and do not store any part of the OS or of an OS driver, then such drives are prioritized based on the number of hits.

Also, in some embodiments, if multiple drives prioritized on any factors receive the same priority, e.g. multiple drives receive priority 1000 because the store OS portions, then such drives can be prioritized based on less important factors. For example, a drive that stores an OS portion and an OS driver may receive priority 1010, and the drive the stores an OS portion but not OS driver portion may receive priority 1000. Alternatively, both drives may receive priority 1000; at step 430, one of the drives is selected arbitrarily, possibly as at step 250 in FIG. 2, or in some other way.

At step 430, the iDRAC selects the unlocked drive having the highest priority. If multiple unlocked drives share the same, highest priority, the iDRAC selects one of such drives arbitrarily, e.g. as at step 250 in FIG. 2, or based on the alphabetical order of the drives' IDs, or in some other way.

In some embodiments, the iDRAC never builds the database 304, i.e. step 420 is omitted. At step 430, the iDRAC selects a drive to unlock based on chain (1), selecting the drive based on the most important factor ("Event"), and if this does not result in selection, then applying less and less important factors in their order in chain (1). Thus, the iDRAC first determines if any of the locked drives has an event pending. If so, this drive is selected. If there are multiple "event pending" drives, the iDRAC selects one "event pending" drive arbitrarily, or selects one of the "event pending" drives based on the less important factors in chain (1). For example, if a unique one of the "event pending" drives stores an OS portion, then this drive is selected. If none of the "event pending" drives store any OS portion, or multiple "event pending" drives store OS portions, then the "OS driver" factor is used, and so on down the chain (1).

If none of the locked drives has an event pending, then the iDRAC uses the "OS" factor to select the drive at step 430. If this factor results in selection of multiple drives because multiple locked drives contain OS portions, then the next factor, "OS driver" is used to select one of the multiple drives, and so on.

If no drive is selected at this stage because none of the locked drives has an event pending or contains an OS portion, then the "OS driver" factor is used. The process proceeds to apply less and less important factors down the chain (1), until all the factors are exhausted. If no drive is selected based on chain (1), then one of the locked drives is selected arbitrarily, possibly as in FIG. 2.

The factor importance can be different than in chain (1). For example, in some embodiments, the "Event" factor is less important than the "OS" factor.

In some embodiments, multiple factors are combined to obtain a priority. For example, the "OS" factor may be associated with some score, e.g. 1000; the "OS driver" factor may be associated with a score 800. If a drive 150 stores both the OS and an OS driver, the drive receives a combined priority of 1000+800=1800. Other scores may be based on the Access Order factor, No. of Hits factor, etc.; the drive's priority is obtained by adding these scores or combining the scores in some other way. The scores may be weighted based on their importance or recency; for example, the No. of Hits can be weighted to give greater weight to the more recent hits. Also, "Access Order" can be weighted depending on how recent the previous power-up was. Also, "Access Order" may provide a score based on multiple previous power-ups. More recent power-ups may be provided a higher score.

The invention is not limited to the embodiments described above. Some or drives 150 may be never locked, and they are not part of the method of FIG. 4. The drives connected to a single interface such as HB 190 are unlocked sequentially, but drives connected to different interfaces may be unlocked in parallel. Further, in some embodiments, for the sequentially unlocked drives connected to the same interface, the unlocking operations of different drives may overlap. For example, in some embodiments, each unlocking operation comprises sending an unlocking command with a corresponding KEK to a respective drive. The commands are send sequentially, but a subsequent command can be sent before the previous command has been fully executed.

The invention is not limited to the system architecture of FIG. 3, but covers many architectures suitable for computer systems which may or may not be connected to a network. The invention covers many information handling systems (IHS). Specifically, as the value and use of information continues to increase, individuals and businesses seek additional ways to process and store information. An information handling system processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The invention includes methods described above, and devices (e.g. dRACs) and/or computer systems configured (e.g. programmed) to execute such methods. The invention also includes computer readable media comprising computer instructions executable by such devices (e.g. their processors) to configure the devices to execute such methods.

Other embodiments and variations are within the scope of the invention, as defined by the appended claims.

The invention claimed is:

1. A storage device unlocking system, comprising:
   a plurality of storage devices; and
   a storage device unlocking subsystem that is coupled to each of the plurality of storage devices, wherein the storage device unlocking subsystem is configured, in response to an initialization of a computing system that includes the plurality of storage devices, to:
   identify each of the plurality of storage devices;
   retrieve, from a storage system, unlocking keys associated with each of the plurality of storage devices; and
   use the unlocking keys to decrypt data stored on the plurality of storage devices in order to unlock the plurality of storage devices according to unlocking priorities for the plurality of storage devices that are stored in the storage system such that:

a first subset of the storage devices are unlocked during a first time period in response to the first subset of storage devices having at least one first unlocking priority that is based on the first subset of storage devices storing operating system information;

a second subset of the storage devices are unlocked during a second time period that is subsequent to the first time period in response to the second subset of the storage devices having at least one second unlocking priority that is based the second subset of the storage devices having a first access order history identified by access order information included in an access log that is stored in a memory system in the computing system; and a third subset of the storage devices are unlocked during a third time period that is subsequent to the second time period in response to the third subset of the storage devices having at least one third unlocking priority that is based the third subset of the storage devices having a second access order history that is identified by the access order information included in the access log that is stored in the memory system in the computing system and that indicates later historical accesses of the third subset of storage devices relative to historical accesses of the second subset of storage devices indicated by the first access order history.

2. The system of claim 1, wherein the storage device unlocking subsystem includes a remote access controller and a host bus adapter.

3. The system of claim 1, wherein the storage device unlocking subsystem is configured to:

determine data storage information and the access order information for at least some of the plurality of storage devices; and generate, using the data storage information and the access order information for the at least some of the plurality of storage devices, the unlocking priorities for the plurality of storage devices.

4. The system of claim 1, wherein at least one first storage device included in the first subset of the storage devices is unlocked during a first portion the first time period in response to the at least one first storage device including a higher first unlocking priority that is based on the at least one first storage device storing at least a portion of an operating system, and wherein at least one second storage device included in the first subset of the storage devices is unlocked during a second portion of the first time period that is subsequent to the first portion of the first time period in response to the at least one second storage device including a lower first unlocking priority that is based on the at least one second storage device storing at least one operating system driver.

5. The system of claim 1, wherein the first access order history indicates historical accesses to the second subset of storage devices during previous initializations of the computing system, and wherein the second access order history indicates historical accesses to the second subset of storage devices during previous initialization operations during previous initializations of the computing system.

6. The system of claim 1, wherein the storage device unlocking subsystem is configured to:

receive a current access request for a first storage device included in the plurality of storage devices; and prioritize, in response to receiving the current access request for the first storage device, the unlocking of the first storage device over any of the plurality of storage devices that have not yet been unlocked such that the first storage device is the next storage device that is unlocked.

7. The system of claim 1, wherein the storage device unlocking subsystem is configured to:

store the unlocking keys associated with each of the plurality of storage devices in the storage system.

8. An Information Handling System (IHS), comprising:

a hardware processing system; and a hardware memory system that is coupled via a bus to the hardware processing system and that includes instruction that, when executed by the hardware processing system, cause the hardware processing system to provide a storage device unlocking subsystem that is configured, during initialization operations, to:

identify each of a plurality of storage devices;

retrieve, from a storage system, unlocking keys associated with each of the plurality of storage devices; and use the unlocking keys to decrypt data stored on the plurality of storage devices in order to unlock the plurality of storage devices according to unlocking priorities for the plurality of storage devices that are stored in the storage system such that:

a first subset of the storage devices are unlocked during a first time period in response to the first subset of storage devices having at least one first unlocking priority that is based on the first subset of storage devices storing operating system information;

a second subset of the storage devices are unlocked during a second time period that is subsequent to the first time period in response to the second subset of the storage devices having at least one second unlocking priority that is based the second subset of the storage devices having a first access order history identified by access order information included in an access log that is stored in the hardware memory system; and a third subset of the storage devices are unlocked during a third time period that is subsequent to the second time period in response to the third subset of the storage devices having at least one third unlocking priority that is based the third subset of the storage devices having a second access order history that is identified by the access order information included in the access log that is stored in the hardware memory system and that indicates later historical accesses of the third subset of storage devices relative to historical accesses of the second subset of storage devices indicated by the first access order history.

9. The IHS of claim 8, wherein the storage device unlocking subsystem is configured to:

determine data storage information and the access information for at least some of the plurality of storage devices; and generate, using the data storage information and the access order information for the at least some of the plurality of storage devices, the unlocking priorities for the plurality of storage devices.

10. The IHS of claim 8, wherein at least one first storage device included in the first subset of the storage devices is unlocked during a first portion the first time period in response to the at least one first storage device including a higher first unlocking priority that is based on the at least one first storage device storing at least a portion of an operating system, and wherein at least one second storage device included in the first subset of the storage devices is unlocked during a second portion of the first time period that is subsequent to the first portion of the first time period in response to the at least one second storage device including a lower first unlocking priority that is based on the at least one second storage device storing at least one operating system driver.

11. The IHS of claim 8, wherein the first access order history indicates historical accesses to the second subset of storage devices during previous initializations of the computing system, and wherein the second access order history indicates historical accesses to the second subset of storage devices during previous initialization operations during previous initializations of the computing system.

12. The IHS of claim 8, wherein the storage device unlocking subsystem is configured to:
receive a current access request for a first storage device included in the plurality of storage devices; and
prioritize, in response to receiving the current access request for the first storage device, the unlocking of the first storage device over any of the plurality of storage devices that have not yet been unlocked such that the first storage device is the next storage device that is unlocked.

13. The IHS of claim 8, wherein the storage device unlocking subsystem is configured to:
store the unlocking keys associated with each of the plurality of storage devices in the storage system.

14. A method for unlocking storage devices, comprising:
identifying, by a storage device unlocking subsystem in a computing system during initialization of the computing system, each of a plurality of storage devices;
retrieve, by a storage device unlocking subsystem from a storage system, unlocking keys associated with each of the plurality of storage devices; and
using, by the storage device unlocking subsystem, the unlocking keys to decrypt data stored on the plurality of storage devices in order to unlock the plurality of storage devices according to unlocking priorities for the plurality of storage devices that are stored in the storage system such that:
a first subset of the storage devices are unlocked during a first time period in response to the first subset of storage devices having at least one first unlocking priority that is based on the first subset of storage devices storing operating system information;
a second subset of the storage devices are unlocked during a second time period that is subsequent to the first time period in response to the second subset of the storage devices having at least one second unlocking priority that is based the second subset of the storage devices having a first access order history identified by access order information included in an access log that is stored in a memory system in the computing system; and
a third subset of the storage devices are unlocked during a third time period that is subsequent to the second time period in response to the third subset of the storage devices having at least one third unlocking priority that is based the third subset of the storage devices having a second access order history that is identified by the access order information included in the access log that is stored in the memory system and that indicates later historical accesses of the third subset of storage devices relative to historical accesses of the second subset of storage devices indicated by the first access order history.

15. The method of claim 14, wherein the storage device unlocking subsystem includes a remote access controller and a host bus adapter.

16. The method of claim 14, further comprising:
determining, by the storage device unlocking subsystem, data storage information and the access order information for at least some of the plurality of storage devices; and
generating, by the storage device unlocking subsystem using the data storage information and the access order information for the at least some of the plurality of storage devices, the unlocking priorities for the plurality of storage devices.

17. The method of claim 14, wherein at least one first storage device included in the first subset of the storage devices is unlocked during a first portion the first time period in response to the at least one first storage device including a higher first unlocking priority that is based on the at least one first storage device storing at least a portion of an operating system, and wherein at least one second storage device included in the first subset of the storage devices is unlocked during a second portion of the first time period that is subsequent to the first portion of the first time period in response to the at least one second storage device including a lower first unlocking priority that is based on the at least one second storage device storing at least one operating system driver.

18. The method of claim 14, wherein the first access order history indicates historical accesses to the second subset of storage devices during previous initializations of the computing system, and wherein the second access order history indicates historical accesses to the second subset of storage devices during previous initialization operations during previous initializations of the computing system.

19. The method of claim 14, further comprising:
receiving, by the storage device unlocking subsystem, a current access request for a first storage device included in the plurality of storage devices; and
prioritizing, by the storage device unlocking subsystem in response to receiving the current access request for the first storage device, the unlocking of the first storage device over any of the plurality of storage devices that have not yet been unlocked such that the first storage device is the next storage device that is unlocked.

20. The method of claim 14, further comprising:
storing, by the storage device unlocking subsystem, the unlocking keys associated with each of the plurality of storage devices in the storage system.

* * * * *

UNITED STATES PATENT AND TRADEMARK OFFICE
CERTIFICATE OF CORRECTION

| | |
|---|---|
| PATENT NO. | : 11,429,541 B2 |
| APPLICATION NO. | : 16/241817 |
| DATED | : August 30, 2022 |
| INVENTOR(S) | : Paulraj et al. |

It is certified that error appears in the above-identified patent and that said Letters Patent is hereby corrected as shown below:

In the Claims

Claim 1, Column 7, Line 11, "that is based the second" should read --that is based on the second--;
Claim 1, Column 7, Line 20, "that is based the third" should read --that is based on the third--;
Claim 8, Column 8, Line 36, "that is based the second" should read --that is based on the second--;
Claim 8, Column 8, Line 45, "that is based the third" should read --that is based on the third--;
Claim 14, Column 9, Line 53, "that is based the second" should read --that is based on the second--;
Claim 14, Column 10, Line 2, "that is based the third" should read --that is based on the third--.

Signed and Sealed this
Twenty-fifth Day of October, 2022

Katherine Kelly Vidal
*Director of the United States Patent and Trademark Office*